Patented Mar. 20, 1951

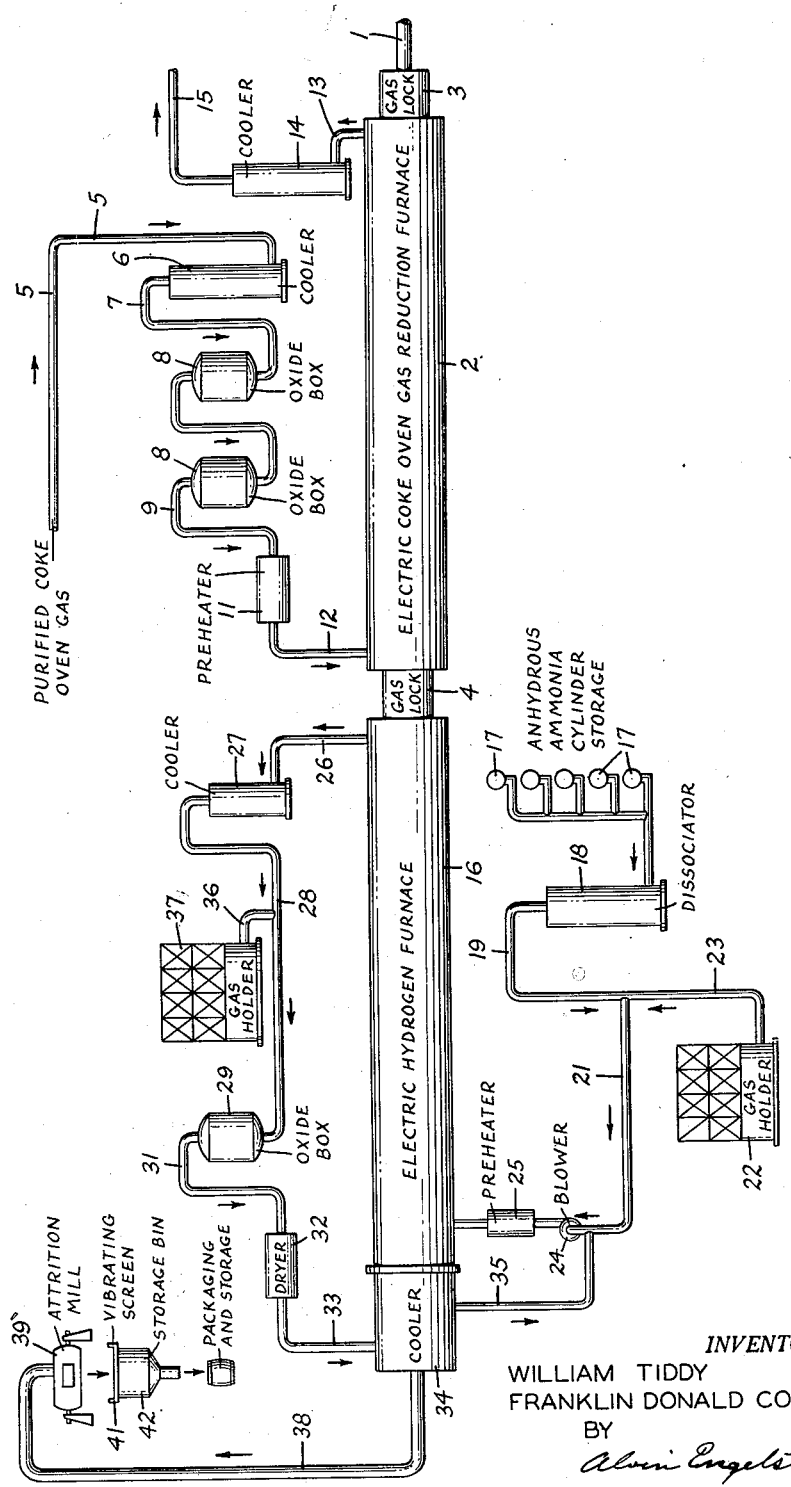

2,545,932

UNITED STATES PATENT OFFICE 2,545,932

TWO-STAGE CONVERSION OF IRON OXIDE INTO IRON

William Tiddy, Manhasset, N. Y., and Franklin D. Cooper, Ashland, Ky., assignors to Allied Chemical & Dye Corporation, New York, N. Y., a corporation of New York Application May 26, 1948, Serial No. 29,326

4 Claims. (Cl. 75—35)

1

This invention relates to the reduction of metallic compounds and more particularly refers to the production of powdered iron from iron oxides.

A conventional method of converting oxides has been to effect such reduction by pure hydrogen or a mixture of hydrogen and nitrogen. One of the drawbacks of such process is its high cost due to the use of expensive hydrogen. Other cheaper and available reducing agents such as coke oven gas have been suggested as a medium for reducing metallic oxides but to our knowledge none has been successfully utilized commercially in production of powdered iron from oxides of iron.

An object of the present invention is to provide an efficient, economical process for converting oxides of iron into powdered iron by effecting the major portion of the reduction with coke oven gas.

Another object of the present invention is to provide a method of controlling the carbon content in the final iron product.

Powdered iron suitable for molding must meet rigid chemical and physical specifications which include an iron content of at least 98% and a carbon content below 0.55%. Frequently the carbon specifications of powdered iron are more exacting, depending upon the needs of the particular consumer who may require powdered iron having a specific carbon content within the range of 0.08 to 0.55% carbon. Powdered iron of superior quality has a carbon content of less than 0.26% as well as an oxygen-free iron content of over 99%. When coke oven gas is employed to reduce iron oxides to powdered iron in accordance with the methods disclosed by the prior art, an unsatisfactory iron product results, that is, a product usually containing less than 98% iron and more than 0.55% carbon, the latter resulting from the deposition of carbon and carbon compounds due to the decomposition of hydrocarbons in the coke oven gas.

A preferred method of practicing the process in accordance with the present invention comprises passing the purified coke oven gas through or over an iron oxide maintained at a temperature in the range of 1200° to 1400° F., preferably about 1300° F., for a period of time sufficient to effect at least 95% removal of oxide-oxygen, and then passing gaseous hydrogen or gaseous hydrogen-nitrogen mixtures containing 4 to 20 grains of water per cubic foot gas measured at 60° F. and 30 inches mercury in contact with the partially reduced iron oxide at a temperature between 1250° F. and 1500° F., preferably about

2

1400° F., until substantially all the oxide-oxygen and sulfide-sulfur are eliminated.

In view of the high cost of hydrogen, hydrogen may be recirculated in contact with the iron oxide. As is well known hydrogen combines with the oxygen in the iron oxides to form water, which water returns along with the recirculated hydrogen gases for further contact with the partially reduced iron oxide thus making it difficult, if not impossible, to substantially completely reduce the iron oxide to powdered iron due to the reversible reaction of the water with the partially reduced iron. We have found that if the water content in the hydrogen gases is limited to an amount of moisture not exceeding 20 grains per cubic foot gas measured at 60° F. and 30 inches mercury, iron oxide may be efficiently reduced to a product containing at least 98% free iron. We have further discovered that water in the hydrogen gases effects elimination of carbide-carbon in the final product and that by controlling the water content of the hydrogen or hydrogen-nitrogen gaseous mixtures to between 4 and 20 grains per cubic foot gas measured at 60° F. and 30 inches mercury it is possible to maintain combined carbon in the final product at any desired range from about 0.08% carbon by weight when the hydrogen gas has 20 grains water per cubic foot gas to about 0.55% by weight with hydrogen gas containing 4 grains water per cubic foot gas.

The accompanying drawing is a diagrammatic flow sheet illustrating one method of practicing the present invention.

Referring to the drawing, iron oxide introduced through conduit 1 is disposed in a thin layer preferably not exceeding ½" at the bottom of electric coke oven gas reduction furnace 2 provided with gas locks 3 and 4 at its open ends. Purified coke oven gas in a "once through" operation passes through line 5, cooler 6, line 7 and oxide boxes 8 to insure complete removal of hydrogen sulfide from the gas and thence through line 9 into preheater 11 to be raised to a temperature of approximately 1000° F. prior to entering furnace 2 through line 12. Gases are released from the top of furnace 2 through line 13, cooled in cooler 14 and discharged from the system through line 15 for use as fuel or other disposition. A stream of purified coke oven gas continues to flow over and through the iron oxide in furnace 2 maintained at a temperature between 1200° F. and 1400° F., until at least 95% of the oxide-oxygen is removed from the iron oxide. Temperatures in excess of 1500° F. would accelerate the reaction between coke oven gas and iron oxide but the higher temperatures would be accompanied by increased decomposition of methane and other hydrocarbons in the gases with consequent greater deposition of carbon on the iron. By extending the time of reaction at a temperature below 1400° F. we accomplish the desired amount of reduction of iron oxide without depositing unduly large amounts of carbon which are removable with difficulty in the succeeding reducing stage employing hydrogen gas. Partially reduced iron oxide is then transferred into electric hydrogen furnace 16 provided with gas lock, not shown in the drawing, at its discharge end. Furnaces 2 and 16 may be of any conventional design suitable for the purpose. Final reduction of the iron oxide may be accomplished with hydrogen or a mixture of hydrogen and nitrogen. A convenient method for producing the hydrogen-nitrogen mixtures comprises passing anhydrous ammonia from storage cylinders designated by numeral 17 into dissociator 18 to effect catalytic decomposition of ammonia into hydrogen and nitrogen and the mixture of gases enter the system through lines 19 and 21. If hydrogen is the medium for effecting final reduction of the iron oxide, hydrogen gas from gas holder 22 may be passed through lines 23 and 21 and forced by blower 24 through preheater 25 which elevates it to a temperature of approximately 1000° F. and thence into electric hydrogen furnace 16. After the hydrogen gases have contacted the layer of partially reduced iron oxide, they are released from the top of furnace 16 through line 26 into cooler 27 wherein the gases are substantially reduced in temperature. Cooled gases then flow through line 28, through oxide box 29 to complete removal of hydrogen sulfide from the gases, and through line 31 into dryer 32 which may be any conventional type suitable for the purpose for removal of any excess moisture from the gases. Cooled and dried gases then pass through line 33, cooler 34, line 35 to be recirculated to furnace 16 by blower 24. Dryer 32 reduces moisture in the gases to between 4 and 20 grains per cubic foot gas measured at 60° F. and 30 inches mercury thereby regulating the combined carbide-carbon in the final iron product from 0.55% to 0.08% by weight. Any excess gas such as nitrogen built up in the system may be relieved therefrom by passage through line 36 into gas holder 37. Hydrogen or hydrogen-nitrogen mixtures are continuously recirculated in contact with the partially reduced iron oxide in electric furnace 16 maintained at a temperature between 1250° F. to 1500° F., until the iron oxide contains about 99% free iron. In order to avoid reoxidation of the iron, hot iron discharged from furnace 2 is substantially reduced in temperature prior to exposure to the atmosphere by heat exchange with dry and cooled hydrogen gas passed through cooler 34. The cooled iron product moves through conduit 38 into attrition mill 39, vibrating screen 41, storage bin 42 and thence to storage.

The following comparative examples further illustrate the invention. Pickle liquor containing 201 grams per liter ferrous sulfate and 22 grams per liter free sulfuric acid is treated at a temperature of 50° C. and a pressure of 35 pounds per square inch gauge with a 50-50 mixture of ammonia and air at the rate of 6 cubic feet of gases measured at 60° F. and 30 inches mercury per hour per gallon until the pH of the pickle liquor is raised to 6.2. Thereafter the temperature of the liquor is increased to 95° C. and the pressure to 75 pounds per square inch gauge. Air is introduced into this mixture at the rate of about 27 cubic feet measured at 60° F. and 30 inches mercury per hour per gallon of liquor. Admixed with this air is a sufficient amount of gaseous ammonia to maintain the pH of the liquor at 6.7. The introduction of air and ammonia continues until tests show the absence of soluble iron in the pickle liquor. Precipitate resulting from this reaction is dried at 105° C. and subsequently calcined for one hour by passing combustion gases at a temperature of 1800° F. in direct contact with the dried precipitate.

*Example 1.*—A portion of the iron oxide produced as described above is placed in a thin layer about ½ inch thick on the bottom of an electric furnace closed at both ends. Coke oven gas having the following analysis is employed to effect initial reduction of the iron oxide in the furnace:

*Analysis of coke oven gas*

| | Percent |
|---|---|
| Carbon monoxide | 5.0 |
| Carbon dioxide | 1.6 |
| Hydrogen | 50.2 |
| Nitrogen | 7.6 |
| Oxygen | 0.3 |
| Methane | 31.8 |
| Illuminants | 3.5 |

This coke oven gas is passed "once-through" over and through the iron oxide in the furnace maintained at a temperature of 1300° F. at the rate of approximately 16 cubic feet measured at 60° F. and 30 inches mercury per hour of coke oven gas per pound of iron oxide for 5 hours. The iron product resulting from the coke oven gas reduction contains 3.21% FeO and 0.68% carbon by weight.

Incompletely reduced iron oxide from the coke oven gas reduction stage is then placed in a thin layer on the bottom of an electric furnace similar to the one employed in connection with the coke oven gas reduction. Hydrogen gas is introduced in one end of the furnace, passed through the furnace maintained at 1400° F. in contact with the incompletely reduced iron oxide therein, withdrawn from the furnace, cooled and dried to reduce the moisture content in the gas to 20 grains per cubic foot measured at 60° F. and 30 inches mercury and the dried gas returned to the inlet of the furnace for further contact with the iron oxide therein. Recirculation of the hydrogen gas is continued for about 2 hours at the rate of 7.5 cubic feet measured at 60° F. and 30 inches mercury per hour per pound of incompletely reduced iron oxide. The resulting product contains 1.84% FeO and 0.05% carbon.

*Example 2.*—A portion of the incompletely reduced iron oxide resulting from the partial reduction of coke oven gas as described in Example 1 was further reduced with hydrogen under similar operating conditions as explained in connection with Example 1 with the exception that the hydrogen gas leaving the electric furnace is cooled and dried by passing the gas through activated alumina to effect reduction of the moisture in the gas to 4 grains per cubic foot measured at 60° F. and 30 inches mercury and the cooled, dried gas recirculated to the furnace. The resulting iron product contains 0.24% FeO and 0.55% carbon.

*Example 3.*—Another operation is carried out in a manner similar to that described in Example 1 with the exception that the hydrogen leaving the electric furnace in the second stage of the reducing operation is cooled and dried to effect reduction of the moisture in the gas to 13 grains per cubic foot measured at 60° F. and 30 inches mercury prior to each passage into the furnace. The resulting iron product contains .32% FeO and .18% carbon.

The results of the three examples above demonstrate the effect of moisture content in the hydrogen gas on percent carbon and FeO in the iron product.

Although certain preferred embodiments of the invention have been disclosed for purposes of illustration, it will be evident that various changes and modifications may be made therein without departing from the scope and spirit of the invention.

The term "hydrogen" as used hereinafter in the appended claims is intended to include gaseous hydrogen and mixtures of hydrogen and nitrogen.

We claim:

1. A process for the production of iron from oxides of iron which comprises passing coke oven gas in contact with iron oxide maintained at a temperature above 1200° F. for a time sufficient to effect at least 95% removal of oxide-oxygen from the iron oxide and then passing hydrogen gas containing between 4 and 20 grains water per cubic foot gas measured at 60° F. and 30 inches mercury in contact with the incompletely reduced iron oxide at a temperature between 1250° F. and 1500° F. until at least 98% of the oxide oxygen is eliminated and the carbon content is reduced to less than 0.55%.

2. A process for the production of iron from oxides of iron which comprises passing coke oven gas once through in contact with iron oxide maintained at a temperature between 1200° F. and 1400° F. for a time sufficient to effect at least 95% removal of oxide-oxygen from the iron oxide and then passing hydrogen gas containing between 4 and 20 grains water per cubic foot gas measured at 60° F. and 30 inches mercury in contact with the incompletely reduced iron oxide at a temperature between 1250° F. and 1500° F. until at least 98% of the oxide-oxygen in the iron oxide is eliminated and the carbon content is reduced to less than 0.55%.

3. A process for the production of iron from oxides of iron which comprises passing coke oven gas once through in contact with iron oxide maintained at a temperature between 1200° F. and 1400° F. for a time sufficient to effect at least 95% removal of oxide-oxygen from the iron oxide, passing hydrogen gas containing between 4 and 20 grains water per cubic foot gas measured at 60° F. and 30 inches mercury in contact with the incompletely reduced iron oxide at a temperature between 1250° F. and 1500° F., recirculating hydrogen gas in contact with the incompletely reduced iron oxide at a temperature between 1250° F. and 1500° F. for a length of time sufficient to convert more than 98% of the iron oxide to iron and to reduce the carbon content of the iron to less than 0.55%, and reducing the moisture content of the recirculated hydrogen gas prior to each passage in contact with the incompletely reduced iron oxide to an amount between 4 and 20 grains per cubic foot gas measured at 60° F. and 30 inches mercury.

4. A process for the production of iron from oxides of iron which comprises passing coke oven gas once through in contact with iron oxide maintained at a temperature between 1200° F. and 1400° F. for a time sufficient to effect at least 95% removal of oxide-oxygen from the iron oxide, passing hydrogen gas containing between 4 and 20 grains water per cubic foot gas measured at 60° F. and 30 inches mercury in contact with the incompletely reduced iron oxide at a temperature between 1250° F. and 1500° F., recirculating hydrogen gas in contact with the incompletely reduced iron oxide at a temperature between 1250° F. and 1500° F. for a length of time sufficient to convert more than 98% of the iron oxide to iron and to reduce the carbon content of the iron to less than 0.55%, and reducing the moisture content in the hydrogen gas prior to each passage in contact with the incompletely reduced iron oxide to between 4 and 20 grains per cubic foot gas measured at 60° F. and 30 inches mercury thereby regulating the carbon in the iron product from about 0.55% carbon when employing hydrogen containing 4 grains moisture per cubic foot to about 0.08% carbon when employing hydrogen containing 20 grains per cubic foot.

WILLIAM TIDDY.
FRANKLIN D. COOPER.

REFERENCES CITED

The following references are of record in the file of this patent:

UNITED STATES PATENTS

| Number | Name | Date |
| --- | --- | --- |
| 1,310,724 | Westberg | July 22, 1919 |
| 1,433,854 | Sinding-Larsen | Oct. 21, 1922 |
| 1,979,820 | Bowling | Nov. 6, 1934 |
| 2,282,144 | Fahrenwald | May 5, 1942 |
| 2,329,862 | Terry et al. | Sept. 21, 1943 |
| 2,379,423 | Cape et al. | July 5, 1945 |
| 2,368,489 | Patterson | Jan. 30, 1945 |

FOREIGN PATENTS

| Number | Country | Date |
| --- | --- | --- |
| 199,364 | Great Britain | Void 1923 |

OTHER REFERENCES

"Controlled Atmospheres," published by the American Society for Metals, 1942, pages 60 and 61.

"Industrial Applications of Controlled Atmospheres" by Ivor Jenkins, published 1946 by Chapman and Hall, Ltd. London, England, pages 212, 276, 277, relied on.